May 5, 1942.　　　　H. OSWALD　　　　2,281,987
INTERNAL COMBUSTION ENGINE AND CONTROL APPARATUS
Filed Oct. 28, 1937　　　2 Sheets-Sheet 1
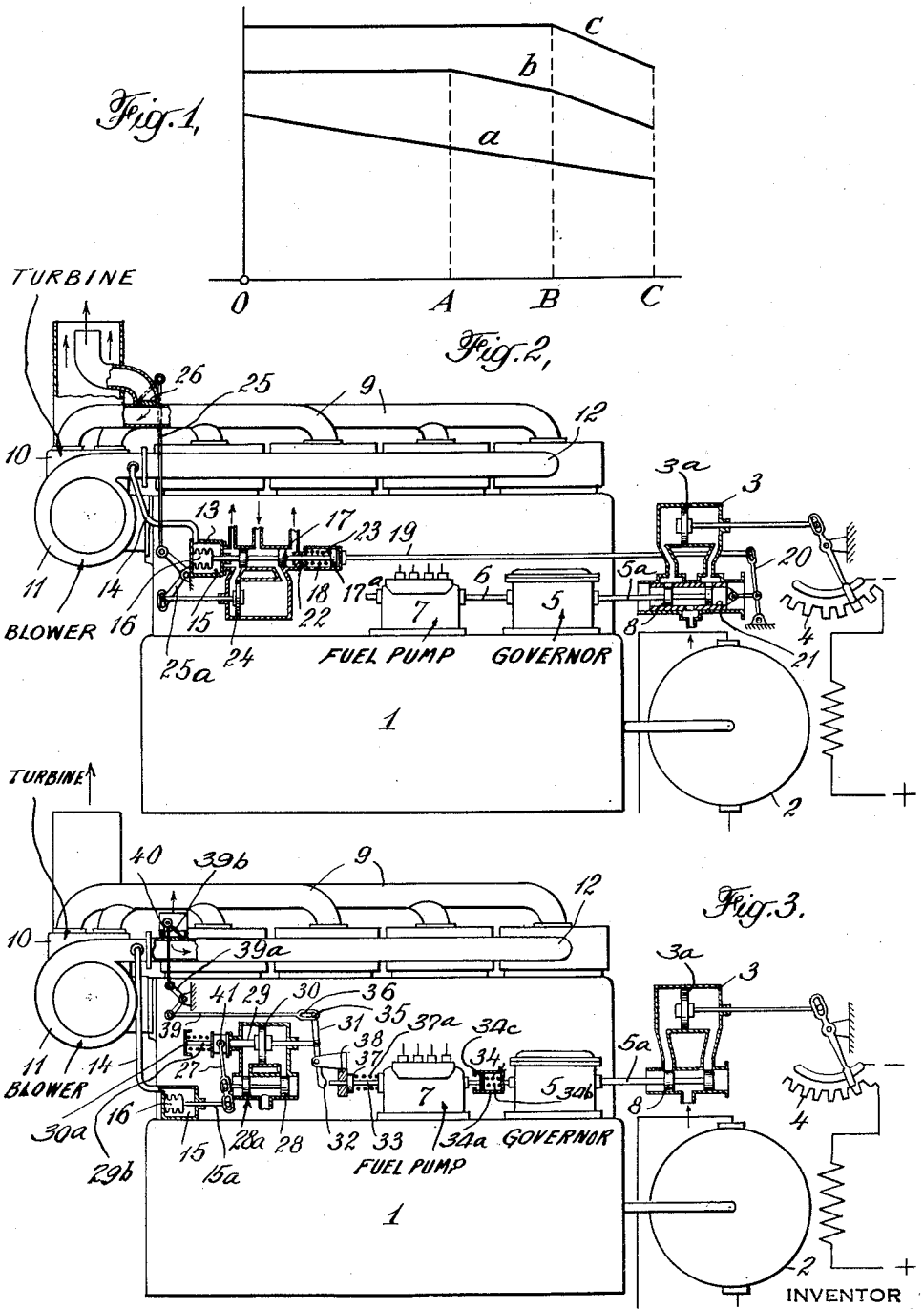

May 5, 1942.　　　　　H. OSWALD　　　　　2,281,987
INTERNAL COMBUSTION ENGINE AND CONTROL APPARATUS
Filed Oct. 28, 1937　　　2 Sheets-Sheet 2
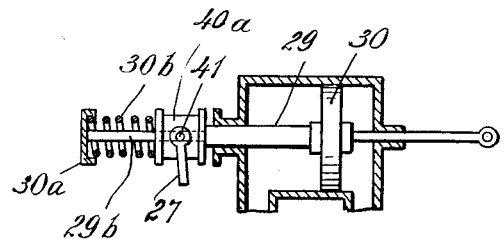
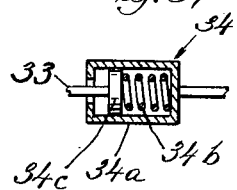
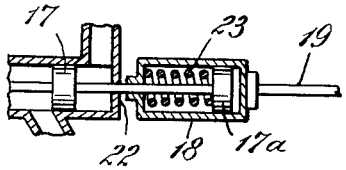
INVENTOR
*Hans Oswald*
BY
*Pennie Davis Marvin & Edmonds*
ATTORNEYS Patented May 5, 1942

2,281,987

UNITED STATES PATENT OFFICE 2,281,987

INTERNAL COMBUSTION ENGINE AND CONTROL APPARATUS

Hans Oswald, Winterthur, Switzerland, assignor to Sulzer Freres, Societe Anonyme, Winterthur, Switzerland Application October 28, 1937, Serial No. 171,416
In Switzerland November 7, 1936

8 Claims. (Cl. 60—13)

This invention relates to control apparatus for internal combustion engines of the kind to which air is supplied by a supercharger.

The object of the present invention is to provide in combination with an internal combustion engine to which air is supplied by a supercharger, control apparatus which, when the supercharging pressure reaches a predetermined value, automatically prevents a rise in supercharging pressure above that value. Thus, as the altitude at which the engine operates is decreased and the barometric pressure rises, a point occurs when the predetermined supercharging pressure is reached whereupon on further reduction in altitude and increase in barometric pressure, the control apparatus prevents a further increase in the supercharging pressure and thus maintains this supercharging pressure constant.

Means may also be provided whereby, for supercharging pressures below the predetermined value, the control apparatus acts to regulate the quantity of fuel delivered to the engine in dependence on the supercharging pressure.

The control of the supercharging pressure may be effected in various ways. In one arrangement, however, wherein the supercharger is driven by an exhaust-driven turbine or like device deriving power from the exhaust gases, the supercharging pressure may be controlled by valve apparatus controlling the proportion of exhaust gases which pass respectively through the exhaust-driven turbine and direct to the atmosphere without passing through such turbine.

In an alternative arrangement the supercharging pressure may be controlled by permitting part of the air delivered by the supercharger to be discharged to the atmosphere through a valve under the control of the control apparatus.

In the drawings:

Fig. 1 shows curves indicating variations of barometric pressure, of charging pressure and the load of the engine;

Figs. 2 and 3 illustrate the two embodiments of apparatus in accordance with the invention;

Fig. 4 is an enlarged fragmentary sectional view of a part of the apparatus of Fig. 3;

Fig. 5 is an enlarged fragmentary sectional view of another part of the apparatus of Fig 3; and Fig. 6 is an enlarged fragmentary sectional view of a part of the apparatus of Fig. 2.

In Fig. 1 line $a$ represents the average barometric pressure as a function of the height above sea level from O to C, the line $b$ the charging pressure, that is to say, the pressure of the air entering into the internal combustion engine, and the line $c$ the load of the internal combustion engine. With decreasing elevation from C to O the average barometric pressure $a$ rises continuously. With a uniform volume of exhaust gas discharged by the engine and driving the supercharger, the pressure of the charging air also increases slightly. If, as shown by line $c$, the load of the engine increases then the pressure of the charging air, as shown by line $b$, increases. If the load on the engine is kept constant from B to O then the rise in the charging air pressure is less and the line $b$ is flatter from B to O than from C to B. At A the charging pressure $b$ reaches the permissible maximum. Then a regulating device comes into operation which automatically maintains constant the charging pressure from this definite adjustable value on.

The apparatus illustrated in Figs. 2 and 3 is especially intended for the operation of highway or railroad vehicles over widely varying altitudes.

In the apparatus of Fig. 2 the internal combustion engine 1 drives the generator 2, the excitation of which is automatically regulated by means of the servomotor 3 and the resistance 4. The speed governor 5, driven by the internal combustion engine, regulates by means of the rod 6 the amount of fuel injected by the fuel pumps 7 and also by means of the valve 8 of the servomotor 3 the excitation of the generator 2 so that the speed of the internal combustion engine 1 and its output are maintained constant in the conventional manner. The rod 6 and the valve 8 are connected together and move as a unitary element. As the speed of the engine decreases, the governor moves the rod 6 and the valve 8 to the left.

The exhaust gases of the internal combustion engine are led by means of the pipes 9 to the exhaust gas turbine 10, which drives the blower 11, and conveys the charging air into the charging pipe 12. The regulating device 13 has a chamber 15 connected to the charging pipe 12 by means of the pipe 14, in which chamber is located the aneroid member 16, on which the charging pressure acts from the outside. The aneroid member 16 is sealed and the space therein is not open to the atmosphere.

One end of the valve 17 is connected to the aneroid member 16 and the opposite end carries a plate or stop 17a mounted in a casing 18 which casing is attached to the end of rod 19. A spring 23 is mounted in the casing and arranged to exert pressure against the casing and the stop 17a. The rod 19 is connected to the lever 20 which displaces the intermediate sleeve valve 21 so that to every absolute charging pressure there corresponds a definite load of the internal combustion engine 1, maintained constant by the servomotor 3. As the piston 17 moves to the left is compresses the spring 23 until it pulls the casing 18 into engagement with the stop 22. The piston 17 continues to move to the left after the casing 18 and rod 19 have reached their limit of movement to the left.

If the barometric pressure and the charging pressure gradually rise, (e. g. as shown in Fig. 1 from C to B), then the pressure in chamber 15 collapses the aneroid member 16 and causes the rod 19 and the sleeve valve 21 to move toward the left so that the shut-off position of the valve 8 is likewise displaced toward the left. On the movement of sleeve valve 21 toward the left, pressure medium is admitted to the right side of the piston 3a of the servomotor 3, so that by the displacement of this piston toward the left the resistance 4 is lessened. As a consequence of this, the engine 1 is more heavily loaded by the generator 2 as the voltage thereof is increased. As the speed of the internal combustion engine 1 decreases and the governor 5 displaces the regulating rod 6 toward the left, the pumps 7 supply more fuel to the engine and the valve 8 comes into the shut-off position, displaced toward the left, until the new load corresponds to the new position of the sleeve valve 21.

The load now increases according to the line c in Fig. 1 until at B it has reached the maximum permissible value. At this moment, the casing 18 strikes on the stop 22. On the further movement of the valve 17 toward the left, which now is disconnected from the rod 19 under compression of the spring 23, no further influence on the load takes place. In this position the valve 17 still keeps open the flow of pressure medium to the space at the right of the piston 24 and connects the space at the left of this piston to the discharge so that piston 24 remains in the extreme left position.

If the barometric pressure rises further, then the charging pressure likewise increases from B to A. At A the aneroid member 16 is compressed to such an extent that the valve 17 begins to regulate the position of the piston 24. The piston 24 keeps closed, in its left end position via the rod 25 and crank 25a, the flap valve 26 in the exhaust gas line 9. If the valve 17 moves to the left beyond the shut-off position, then the flow of pressure medium on the left side of the piston 24 is opened and the right side is connected to the pressure medium discharge. Simultaneously the flap valve 26 is opened but only so much until the charging pressure in the charging pipe 12 has again fallen to the value corresponding to the shut-off position of the valve 17. Thereby the charging pressure will then be maintained constant on further increasing barometric pressure, inasmuch as the flap valve 26 opens further and allows more exhaust gases to flow out.

In the case of decreasing barometric pressure the regulating operations described proceed in the opposite sense.

The apparatus shown in Figs. 3, 4 and 5 comprises an internal combustion engine 1 driving the electric generator 2, the field of which is excited by the variable resistance 4. The governor 5 is driven by and responsive to the speed of the engine and has a rod 5a attached at one end to the valve 8 and at the other end to the case 34a of the resilient coupling 34. The spring 34b presses against the case on the right side and against the stop 34c on the end of the fuel pump rod 33. The left end of the rod 33 has a spring plate 37 against which the spring 37a exerts pressure. Upon decrease of engine speed, the rod 5a moves the case 34a against the spring 34b, thereby urging the stop 34c and rod 33 towards the left increasing the supply of fuel. In this action, the spring 37a urges the rod 33 towards the left. The limit of motion is reached when the plate 37 contacts the stop 38. On the other hand an increase in the speed of the engine will move the rod 5a and case 34a towards the right until it engages the stop 34c pulling the rod 33 to the right and against the action of spring 37a. It will be noted that the movement of the rod 5a will so set the valve 8 when the speed of the engine is increasing or decreasing as to admit fluid pressure against the piston 3a of the servomotor 3, thereby decreasing or increasing the field resistance 4. Whenever equilibrium is reached with respect to the load and engine speed, the valve 8 returns to the neutral position shown in Fig. 3.

The exhaust gases of the engine are discharged into the manifolds 9 and from there pass through and operate the gas turbine 10 which drives the supercharging blower 11, which charges air into the engine cylinders through the charging pipe 12. The charging pipe 12 is connected by pipe 14 to a regulating device comprising an aneroid chamber 15 in which is mounted the aneroid member 16. The aneroid member 16 is sealed so that gas cannot enter it and is expansible or collapsible depending upon the pressure within the chamber 15. The servomotor 28a has a piston valve 28 controlling the supply and discharge of fluid to operate the piston 30. The rod 15a which reciprocates under the action of the aneroid member 16 is connected to a slot in the lever 27 and the valve 28 is connected to an intermediate slot in the lever 27. One end of the rod 29 is connected to the lever 31 at an intermediate point and the other end is connected to rod 29b (see Fig. 4) which is attached to bracket 30a. The spring 30b presses against the bracket 30a at one end and against the sleeve 40a at the other end. The lever 27 is pivoted at 41 to the sleeve 40a which is free to slide towards the left compressing the spring 30b under the action of rod 29 pressing against the face of the sleeve 40a. When the piston 30 is moved towards the right the spring 30b causes the sleeve 40a to follow the rod 29 until the sleeve 40a contacts the flanged edge of the servomotor as shown in Fig. 3. The rod 29 and piston 30 are free to finish their movement toward the right without further affecting the movement of lever 27. The lower end of the lever 31 has a stop 32 arranged to engage the rod 33 and force it towards the right, thereby compressing the springs 34b and 37a. The upper portion of the lever 31 has a roller link 35 in the slot 36 of the rod 39 which is attached at one end to the bell crank 39a. One extremity of the bell crank is attached to a rod 39b which is arranged to open and close the flap valve 40 in the charging pipe 12 to regulate the volume of air charged therethrough from the blower 11. The lever 27, sleeve 41a, rod 29, lever 31, rods 39 and 33 comprise a slip-motion coupling or linkage.

With very low charging pressure (point C in Fig. 1) the control valve 28 is in the right end position, whereby the piston 30 assumes a left end position. The upper link 35 of the lever 31 works freely in the slot 36. The lower end presses the stop 32 on the rod 33 and limits the fuel supply to the minimum value.

If now the charging pressure increases, the valve 28 is first brought into its shut-off position, then beyond it toward the left, and allows oil to enter at the left of the piston 30. As a consequence of this the piston 30 moves toward the right, does not yet influence the rod 39 by means of the slot 36 for the moment, but pulls the stop 32 back a little so that the supply of fuel is slightly increased. The follow-up lever 27 brings the valve 28 again into the shut-off position.

If the charging pressure increases further, the same action or operation is repeated anew. With the charging pressure corresponding to the point B in Fig. 1 the spring plate 37 engages the stop 38 so that in spite of further turning of the lever 31 in clockwise direction the fuel no longer increases. If the charging pressure increases further, then the piston 30 moves further toward the right, and the lever 31 at a given moment takes the slot 36 along; thereby the valve 40 in the charging pipe 12 is opened by means of the rod 39, to let out a part of the air conveyed by the charging compressor. Simultaneously the sleeve 41 of the lever 27 strikes on the casing of the servomotor 28a so that the return is suppressed. If the charging pressure rises still further, the valve 28 allows so much pressure medium to gain admission to the piston 30 that the valve 40 is opened so wide the pressure falls to the value corresponding to the shut-off position of the valve 28.

The sequence of the different events in Fig. 1 represents simply an example. It is also possible that the output of the internal combustion engine remains constant in the whole range from C to O, so that a decrease of the amount of fuel and of the load occurs only when the charging group no longer works normally.

I claim:

1. The combination with an internal combustion engine which comprises a turbine driven by the exhaust gases from the engine, a blower driven by the turbine for charging air into the engine, a regulating device operatively connected to the blower responsive to the charging air pressure, a fuel-supply means for the engine, a speed governor driven by the engine, a variable load driven by the engine, a servomotor for varying the load, means operatively connecting the governor to the servomotor and to the fuel-supply means for simultaneously increasing the fuel and decreasing the load as the speed of the engine decreases and simultaneously decreasing the fuel and increasing the load as the speed of the engine increases, whereby the speed of the engine and its output are maintained constant, and means operatively connecting the regulating device to the servomotor for adjusting the opening and closing positions of the servomotor so that for every charging air pressure there corresponds a definite load of the engine maintained constant by the servomotor.

2. The combination with an internal combustion engine which comprises a blower for charging air into the engine, an aneroid member actuated by the pressure of the charging air, a valve for increasing or decreasing the pressure of the charging air, means connecting the aneroid member to the valve, whereby an increase in charging air pressure above a predetermined high pressure will cause the aneroid member to actuate the valve to decrease the charging air pressure, a variable load driven by the engine, a fuel-supply means for the engine, a speed governor driven by the engine connected to the fuel-supply means for increasing or decreasing the fuel supplied to the engine as the speed of the engine decreases or increases, a resilient coupling, means for varying the load on the engine connected through the resilient coupling to the aneroid member, means connecting the governor to the means for varying the load, whereby at low charging air pressures the aneroid member adjusts the means for varying the load under the action of the governor, and at high charging air pressures the aneroid member does not adjust the means for varying the load but begins to actuate the valve to increase or decrease the charging air pressure.

3. The combination with an internal combustion engine which comprises means for charging air into the engine, valve means for regulating the charging air pressure, a regulating device actuated by the pressure of the charging air, a variable load driven by the engine, means for varying the load, a fuel-supply means for the engine, a speed governor driven by the engine arranged to operate the means for varying the load and the fuel supply means, whereby the fuel supply and the load may be increased or decreased by the governor, and means operatively interconnecting the regulating device, the valve means and the fuel-supply means which permits, at low charging air pressure, the regulating device to limit the fuel to a minimum value without operating the valve and, at higher charging air pressures, to operate the valve to decrease the charging air pressure independently of the fuel-supply means.

4. The combination with an internal combustion engine which comprises means for charging air into the engine, valve means for regulating the pressure of charging air, a fuel-supply means for the engine, a regulating device actuated by the pressure of the charging air, a servomotor under the control of the regulating device, linkage means operatively interconnecting the servomotor, the fuel-supply means and the valve means, and means operating through said linkage means permitting the servomotor to limit the fuel supply when the charging air pressure is low independently of the valve means and to operate the valve means to decrease the charging air pressure when the charging air pressure is high independently of the fuel-supply means.

5. Internal combustion engine apparatus which comprises in combination an engine, a turbine driven by the exhaust of the engine, a supercharger driven by the turbine for charging air under pressure into the engine, fuel-supply means for the engine, a governor driven by the engine connected to the fuel-supply means and arranged to decrease the fuel supply as the engine speed increases and to increase the fuel supply as the engine speed decreases, a variable load connected to and driven by the engine, means for varying the load, means connecting the governor to the means for varying the load to increase or decrease the load as the speed of the engine increases or decreases, a regulating device connected by conduit to the supercharger, whereby the regulating device is actuated by the pressure of the charging air, valve means connected to and actuated by the regulating device for controlling the pressure of the charging air, and coupling means connecting the regulating device to the fuel-supply means, said coupling means having a slip-motion connection and said fuel-supply means having a spring-biased member whereby the regulating device may limit the supply of fuel when the charging air pressure is low and control the valve to decrease the charging air pressure when the charging air pressure is high independently of the fuel-supply means.

6. The combination with an internal combustion engine which comprises means for charging fuel into the engine, means for charging air into the engine, a regulating device responsive to changes in the pressure of the charging air connected by conduit to the means for charging air, means operated by the regulating device controlling the pressure of the charging air, a variable load driven by the engine, load control means, a governor driven by the engine arranged to vary the load control means and the means for charging fuel simultaneously, and coupling means connecting the regulating device to the load control means which permits the regulating device to influence the action of the governor when the charging air pressure is low and to act independently of the load control means when the charging air pressure is high.

7. The combination with an internal combustion engine which comprises means for supplying fuel to the engine, means for charging air into the engine under pressure, a regulating device responsive to the charging air pressure connected by conduit to the means for charging air, a valve in the means for charging air for decreasing the charging air pressure when the charging air pressure is high, said valve being operatively connected to and actuated by the regulating device, a governor driven by the engine arranged to increase or decrease the supply of fuel in accordance with engine speed, and means connecting the regulating device to the means for supplying fuel which limits the supply of fuel when the charging air pressure is low.

8. The combination with an internal combustion engine which comprises means for charging air into the engine, said engine being provided with means to drive a variable load, a governor driven by the engine, a regulating device responsive to the pressure of the charging air, means in operative association with the regulating device and the governor for controlling the load in accordance with engine speed and the pressure of the charging air, and a valve for controlling the pressure of the air charged into the engine, said valve being operatively connected to and actuated by the regulating device.

HANS OSWALD.